United States Patent
Al Hakim et al.

(10) Patent No.: US 6,954,455 B1
(45) Date of Patent: Oct. 11, 2005

(54) TECHNIQUE FOR PROVIDING INTELLIGENT FEATURES FOR CALLS IN A COMMUNICATIONS NETWORK INDEPENDENT OF NETWORK ARCHITECTURE

(75) Inventors: Chaker T. Al Hakim, North Arlington, NJ (US); William Hoffman, Belle Mead, NJ (US); Leonard S. Kelter, Somerset, NJ (US); Barbara Joanne Kittredge, Brunswick, ME (US); James J. Mansell, Fair Haven, NJ (US); D. Mark Parrish, Brooklyn, NY (US); Daniel J. Timoney, Fair Lawn, NJ (US); Daniel Sheinbein, Elizabeth, NJ (US)

(73) Assignee: AT&T Corp., New York, NY (US)

( * ) Notice: Subject to any disclaimer, the term of this patent is extended or adjusted under 35 U.S.C. 154(b) by 908 days.

(21) Appl. No.: 09/824,378

(22) Filed: Apr. 2, 2001

(51) Int. Cl.[7] .............................................. H04L 12/66
(52) U.S. Cl. ...................... 370/352; 370/252; 370/467; 379/88.17
(58) Field of Search ................................. 370/352–356, 370/400, 401, 252, 466, 467; 379/88.17; 709/220–222

(56) References Cited

U.S. PATENT DOCUMENTS 6,327,267 B1 * 12/2001 Valentine et al. ........... 370/466
6,678,265 B1 * 1/2004 Kung et al. ................. 370/352
6,754,181 B1 * 6/2004 Elliott et al. ................ 370/252

* cited by examiner

Primary Examiner—John Pezzlo

(57) ABSTRACT

Subscriber calls in a communications network (10) are handled in accordance with the subscriber's routing plan for either originating and/or terminating calls irrespective of the manner in which such calls originate and terminate. Upon receipt of a call, a query is launched to a database (36) to obtain a called party routing number for the call destination in accordance with the subscriber's routing plan. Once the called party's routing number is obtained in response to the query, the called party's routing number is mapped a to physical port in the network when the routing number corresponds to a circuit-switched call destination or to an IP address when the called party's routing number corresponds to a packet-based call destination. The call is routed to the call destination in accordance with the mapping.

18 Claims, 1 Drawing Sheet

US 6,954,455 B1

TECHNIQUE FOR PROVIDING INTELLIGENT FEATURES FOR CALLS IN A COMMUNICATIONS NETWORK INDEPENDENT OF NETWORK ARCHITECTURE

TECHNICAL FIELD

This invention relates to a technique for handling calls in a telecommunication network that may originate and terminate at one of a packet-based or circuit based customer premises equipment.

BACKGROUND ART

Traditional telephone networks operate to complete a call dialed by a calling party to a called party by establishing a fixed path, commonly referred to as a "circuit," between the calling party and called party for the duration of the call. The process of establishing a circuit between the calling and called parties, referred to as "circuit-switched" telephony commences upon receipt of the call at a local switch in the network serving the calling party. Toll calls and special featured calls (i.e., calls dialed to an 500, 700, 800, 888, 877, 866 or 900 number, and Software Defined Network (SDN) calls) typically pass from the local switch to a toll switch in an Inter-exchange Carrier (IXC) network, such as the AT&T Network. The receipt of a special featured or SDN call in the IXC network triggers a query to a database referred to in the AT&T network as a Network Control Point (NCP), but often referred to in other telecommunications networks as a Service Control Point (SCP).

The NCP/SCP contains routing information that instructs the ingress toll switch how to handle the call in accordance with the calling and/or called party numbers. The call routing instructions translate the dialed number to a Logical Routing Number associated with the called party to enable the IXC network to route the call to that party. Called parties that receive large numbers of special featured calls often maintain call centers in multiple locations to handle such calls. To facilitate call handling, the called parties that maintain such call centers often request that their telecommunications service provider provide varying call treatment at different times for calls originating from different locations. For example, a called party that maintains call centers in different time zones may want its communications service provider to route calls that originate during certain hours to one call center, but route calls originating at other times to a different call center. In addition to, or in place of prescribing a "time-of-day" routing plan, a called party may also prescribe a day-of-the-week routing plan requiring its communications carrier route calls to different destinations depending on the day of the week. Some called parties may also prescribe geographic routing restrictions to restrict receipt of calls from certain jurisdictions.

Subscribers that have traditionally enjoyed circuit-switched telephony service have begun to migrate to packet-based telephone service. Thus, a subscriber may have an IP PBX at one call center linked to a backbone IP network to receive and originate Voice-Over IP calls, while maintaining a circuit-based PBX at another call center linked to a circuit-switched network for originating and receiving Plain Old Telephone Service (POTS) calls. Ideally, a subscriber that enjoys such "hybrid" communication service would like to preserve its prescribed routing plan for all calls regardless whether the calls originate or terminate at a packet-based or circuit-based PBX. Unfortunately, present day providers of communications service lack the ability to readily offer customers that have hybrid service the ability to use their legacy (circuit-switched) routing plan for all calls. As a result, the customer often must replicate their legacy routing plan for packet-based calls, i.e., calls that originate or terminate at a packet-based PBX, to the extent that the communications service provider even offers the ability to provide varying call treatment for packet-based calls.

Thus, there is need for a technique for handling subscriber calls in a telecommunications network in accordance with the subscriber's routing plan that overcomes the aforementioned disadvantages.

BRIEF SUMMARY OF THE INVENTION

Briefly, the present invention provides a technique for handling subscriber calls in a communications network using a routing plan prescribed by the subscriber for all calls independent of the manner in which they originate and terminate. The method commences upon receipt in the network of a call dialed to a called party number by a calling party. Upon receipt of the call, a query is launched to a database containing routing plans to obtain a called party routing number for the called party in accordance with a subscriber routing plan that is independent of the network architecture. Once the called party's routing number is obtained in response to the query, the called party's routing number is mapped a to physical port in the network when the routing number corresponds to a circuit-switched call destination or to an IP address when the called party's routing number corresponds to a packet-based call destination. The call is routed to the call destination in accordance with the mapping. The database could include a single device, or separate devices, each capable of providing routing intelligence to a separate one of a packet and circuit-switched networks.

DETAILED DESCRIPTION

Figure 1:
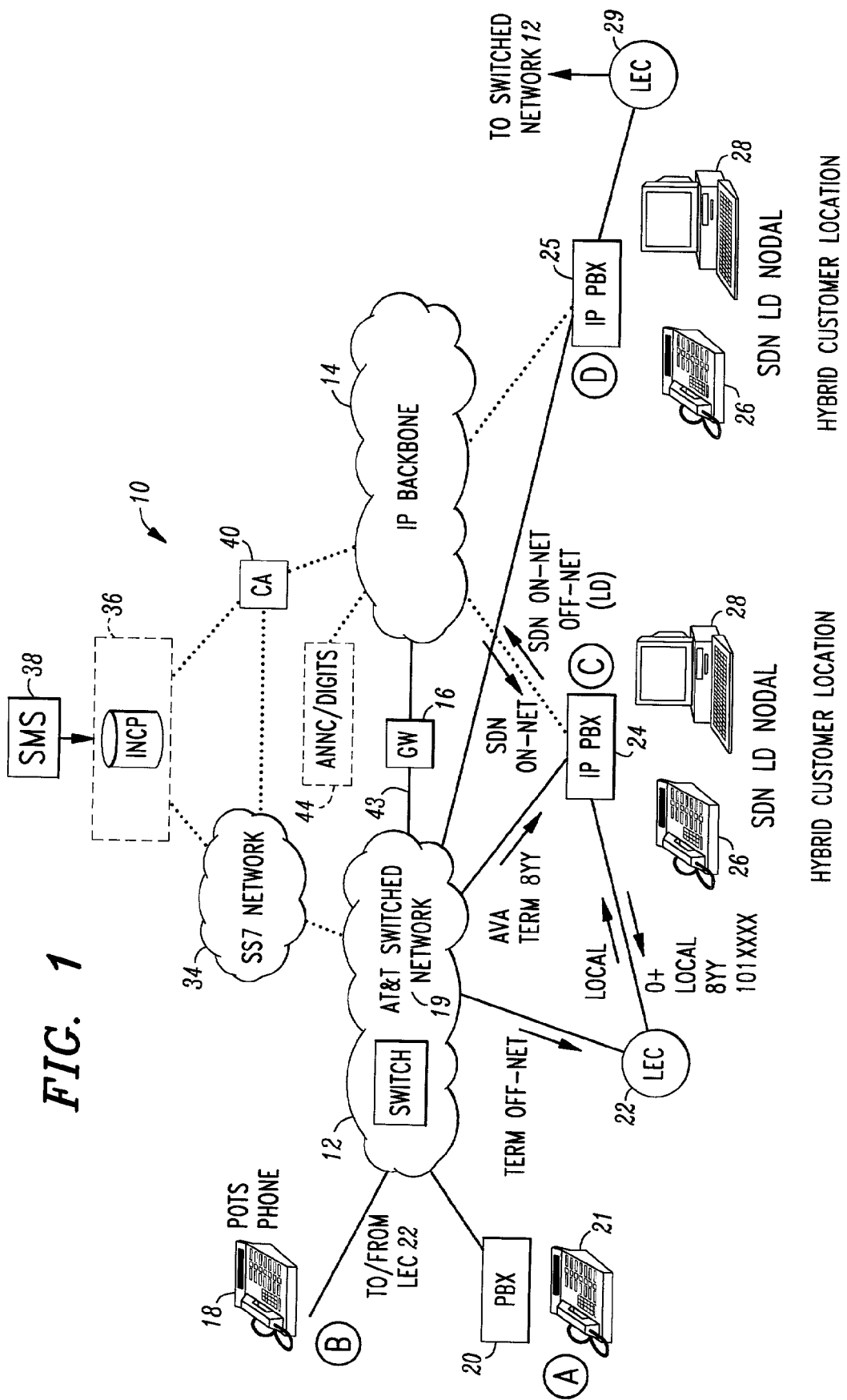
FIG. 1 depicts a telecommunications network in accordance with the invention for handling subscriber calls in accordance with the subscriber's routing plan independent of whether the call originates or terminates at a packet-based node in the network.

FIG. 1 depicts a block diagram of a telecommunications system 10 in accordance with a preferred embodiment of the invention for handling subscriber calls in accordance with the subscriber's routing plan independent of the architecture of the system. For present purposes, a subscriber may include a called party for special featured calls and a calling party for SDN calls, as well as other types of VPN calls of which SDN calls are a subset. The system 10 of FIG. 1 includes a circuit-switched telephone network 12, typically the AT&T switched telephone network, and an Internet Protocol (IP) backbone network 14, such as the IP backbone network maintained by AT&T. A gateway 16 of a type well known in the art provides an interface between the circuit switched network 12 and the IP backbone network 14 to convert calls originating in one network for receipt in the other network.

In the embodiment illustrated in FIG. 1, a POTS-type telephone set 18 has a link to an ingress toll switch 19 in the circuit-switched network 12 through a first Local Exchange Carrier (LEC) circuit-switched network 22. The telephone set 18 represents a "switched access" Software Defined Network (SDN) location. As discussed in greater detail below, the telephone set 18 may enjoy SDN service from the switched network 12 as if it were directly connected to the network, even though in actuality, the telephone set receives local service (dial tone) through the LEC network 22.

A circuit-switched type PBX 20 has a direct link to the ingress switch 19 of the circuit-switched network 12 and thus has a connectivity often referred to as "nodal" by virtue of its direct connection to the circuit-switched network. In practice, the PBX 20 serves at least one, and preferably, a plurality of POTS-type telephone extension sets 21 only one of which is shown. Each extension set 21 may directly launch a call into the switched network 12 by virtue of the direct connection of the PBX 20 to the ingress switch 19. At least one, and preferably a plurality of Internet Protocol (IP) PBXs, illustratively represented by IP PBXs 24 and 25, each enjoy a direct link to the IP backbone network 14, thus allowing each IP telephone extension served by the IP PBX, illustratively represented by an IP telephone set 26 and a personal computer 28, to originate an IP call to, and to receive an IP call from the IP backbone network 14. In addition, the IP PBX 24 has a link to the LEC network 22 while the IP PBX has a link to a LEC network 29. In this way, each extensions served by each IP PBX can originate and receive local calls. To the extent needed, each IP PBX will convert an outgoing IP-originated call destined for a LEC to a POTS format and likewise, will convert an incoming POTS call to an IP format. To the extent that the IP backbone 14 lacks the ability to handle certain types of calls, such as 911 calls and 8YY calls initially handled by a different telecommunications carrier, it may be desirable to handle such calls in the switched network 12 rather than the IP backbone network 14. For that reason, each IP PBX, such as IP PBXs 24 and 25, has a link to the switched network 12 so that calls incapable of being handled in the IP backbone network 14 can be handled in the switched network after origination by, or prior to termination at one of the IP PBXs 24 and 25. A signaling network 34, such as AT&T's SS7 signaling network, connects the switched network 12 to an Intelligent Network Control Point (IN NCP) 36 that typically takes the form of a database or combination of databases that contain instructions to enable the network to route SDN and special featured calls. The call routing instructions within the IN NCP36 are developed using a Service Management System 38 that takes the form of a program translator for translating routing instructions that are developed using a first computer language commonly used for this purpose to a second language of a type typically used by the IN NCP36. As discussed in greater detail below, the IN NCP 36 may include a single device for both circuit-switched and packet calls, or separate devices, each capable of providing routing intelligence to a separate one of a packet and circuit-switched networks. In this way, an existing NCP device could serve the circuit-switched network 12, while a separate new device having the same routing intelligence could serve the IP backbone network, both using the routing data created by the SMS 38.

The IN NCP36, in response to a query from the switched network 12, will return a called party routing number enabling the switched network to route the call to its destination. For example, upon receipt of an 800 number dialed from the POTS-type telephone 18, the switched network 12 will launch a query, typically via a known protocol, such as the TCAP signaling protocol, to the IN NCP36 through the signaling network 34. For a special featured call, the query will typically include the dialed number. In response, the IN NCP36 will return a called party routing number in accordance with a routing plan for the called party by searching among the routing plans indexed by called party numbers. The routing number identifies to a physical destination served by the network, such as the POTS telephone 18. For SDN calls, the query launched to the IN NCP36 may also include the calling party number to allow the IN NCP, in response to the query, to return the routing number in accordance with the routing plan for the calling party.

In the illustrated embodiment, the term IN NCP refers to an "Intelligent" (NCP) whereas the term NCP, in accordance with AT&T's network terminology, refers to a database containing routing information. Other telecommunications service providers often use the term Service Control Point (SCP) to describe the same routing database referred to in the AT&T network as an NCP. Thus, the term IN SCP, referring to an intelligent Service control point could be used to describe the intelligent routing database element 36 instead of the term IN NCP.

Traditionally, subscribers of direct nodal service from the switched network 12 often desire very sophisticated routing of calls, usually in connection with SDN service, and/or in connection with 500, 700, 8YY or 900 calls. To that end, the entity operating the switched network 12 will populate the IN NCP36 with instructions that will accomplish the desired call routing for such subscribers in the conventional manner. Heretofore, subscribers that obtained direct nodal service from both the switched network 12 and the IP backbone network 14, (i.e., subscribers of "hybrid" service), have not had the ability to enjoy the same sophisticated routing for calls that originate or terminate at nodes on the IP backbone network 14 as they do for calls originating or terminating at nodes on the switched network 12. To date, present-day IP backbone networks have generally lacked the capability to offer sophisticated routing plans to nodal customers. To the extent that present-day IP backbone networks do offer any type of specialized routing, the nodal customer must re-implement whatever legacy routing plan used in a switched network, such as the switched network 12 to effect such desired routing in a IP network, such as the backbone network 14, often incurring significant effort and expense to do so.

In accordance with the present invention, both the switched network 12 and the IP backbone 14 advantageously route calls for a given subscriber using a common plan for the subscriber irrespective of whether the calls originate or terminate in the switched network 12 or the IP backbone network 14. To that end, the IP network 14 enjoys a link to a call agent 40, in the form of a programmed processor of group of processors that operate to control the IP backbone network, and in particular, to modify the routing of calls. The call agent 40 enjoys a link to the IN NCP36 and has the capability of querying the IN NCP36 to obtain the routing instructions stored therein. In practice, the call agent 40 also enjoys a link to the signaling network 34 to exchange signaling information with the switched network 12.

In practice, a query launched to the IN NCP36 by either the switched network 12 or the IP backbone 14 causes the IN NCP36 to return a called party routing number to which the call is ultimately routed. In returning the called party routing number, the IN NCP36 consults the instructions contained in the routing plan for the subscriber (calling and/or called party) to determine the ultimate call destination. For SDN calls, the query to the IN NCP36 will typically include the calling party number whereupon the IN NCP36 will access the routing plan indexed to that number. For special featured calls, the query to the IN NCP 36 will include the called party number, whereupon the IN NCP 36 will access the plan indexed to that number. In practice, this scheme is administered presently in the switched network 12 today whether an 8YY or SDN call takes precedence. Typically, in the AT&T switched network, 8YY calls take precedence over SDN calls and other activities like network call denial because the called party pays although SDN calls could in fact take precedence. The routing instructions provided by the IN NCP 36 also advise whether announcement is required and/or whether digits must be collected. As discussed, the IN NCP 36 may exist as a single database that is queried by a switch, such as switch 19 in the switched network 12, or by the call agent 40 on behalf of the IP backbone network 14. Alternatively, the IN NCP 36 could exist as two different databases (not shown), each containing the same routing plan for a given subscriber, but each queried by a separate one of the switched network 12 and by the call agent 40. To best understand the manner in which call routing occurs in accordance with the invention, consider the following scenarios (1) A Circuit-to-Packet SDN call (i.e., a SDN call originating in the switched network 12 and terminating in the IP backbone network 14). (2) A Packet-to-Circuit SDN call, (3) a Packet-to-Packet SDN call, (4) Announcement and/or Digit Collection for a Packet-to-Circuit call, and (5) Alternate Routing for a Packet-to-Circuit Call.

Circuit-to-Packet SDN Call

A circuit-to-packet call from a POTS-type telephone, such as POTS-type telephone extension 21 of FIG. 1 served by the POTS-type PBX 20, to an IP telephone, such as IP telephone 26 served by the IP PBX 25, commences as follows. Initially, a caller at the POTS-type telephone set 21 launches the call by dialing the telephone number 1-732-555-1234 associated with the IP telephone set 26. The call enters the switched network 12 at the ingress switch 19 and, based on an originating trigger, the IN NCP 36 is queried using the well-known TCAP query. The query causes the IN NCP 36 to execute its stored service logic and access the routing plan associated with the calling party for the SDN call. In response to the query, the IN NCP returns a routing number of 456-111-1234 that identifies the IP PBX 25 serving the IP telephone extension 26. The ingress switch 19 checks a translation table (not shown) to obtain the identification of a trunk 43 to the gateway 16 as well as the destination point code (DPC) of the call agent 40. The ingress switch 19 then sends an Integrated Services User part (ISUP) Initial Address Message (IAM) to the call agent 40 via the signaling network 34 to set up a packet call. The call agent 40 checks its translation table for telephone number 456-111-1234 and obtains the IP address of the IP PBX 25, whereupon the gateway 16 signals the IP PBX using an appropriate IP-based protocol (e.g., SIP or H.323) and then opens up a connection. In turn, the IP PBX 25 routes the call to the actual extension 26. In this way, if a special feature, such as call forwarding to another extensions served by the IP PBX has been invoked, the call can still reach its destination without requiring any special treatment by the IP backbone network 14. Any message recording is done, typically in the switched network 12, in accordance with current practices.

Packet-to-Circuit SDN Call

A packet call initiated from an IP telephone, such as the IP telephone 26 served by the IP PBX 25, to a POTS-type telephone, such as POTS telephone set 21 served by the POTS-type PBX 20, commences as follows. Initially, a caller at the IP telephone set 26 launches a call request by dialing the telephone number 1-732-555-5678 associated with the POTS-type telephone set 21. The call request passes into the IP backbone network 14 for receipt at the call agent 40, which, in response queries the IP NCP 36 using an appropriate protocol (e.g. TCAP). The query includes the ANI, that is the telephone number associated the originating telephone extension (e.g., IP telephone set 26) and the dialed number, i.e. the telephone number associated with the called telephone, (i.e., the POTS-type telephone set 21). In response to the query, the IP NCP 36 executes its service logic and returns the routing number of 732-420-5678 representing the telephone number actually associated with the POTS-type telephone set 21. The call agent 40 then instructs the IP backbone 14 network to route the call to the switched network 12 by way of the gateway 16. The call agent 40 sends an ISUP IAM message to the switched network 12 and the call is set up. An Automated Message Accounting (AMA) record is opened at the call agent 40 and elapsed time recording begins when an answer indication is received.

Packet-to-Packet SDN Call

A packet-to-packet call between a first packet telephone (e.g., IP telephone set 26 served by the IP PBX 24) and a second IP telephone (e.g., IP telephone set 26 served by the IP PBX 25) commences as follows. Initially, a caller at IP telephone set 26 served by the IP PBX 24 dials the telephone number 1-732-555-1234 associated with the IP telephone 26 served by the IP PBX 25. The call request enters the IP backbone network 14 and passes to the call agent 40, which, in response, queries the IP NCP 36 using the ANI and the dialed number. The IP NCP 36 executes its service logic and returns a routing number of 456-111-1234 to the call agent 40 identifying the destination IP telephone set. The call agent 40 then checks its translation table for the IP address corresponding to the routing number returned by the IN NCP 36. The call agent 40 sends the IP address to the IP backbone network 14 and IP telephone set 26 served by the PBX 25 is signaled using an appropriate IP-based protocol (e.g., SIP, H.323) to set up the call. Simultaneously, an AMA record is opened at the call agent 40 and elapsed time recording begins when an answer indication is received.

Announcement/Digit Collection for a Packet-to-Circuit Call

The call flow discussed earlier for a packet-to-circuit call did not involve any special activities, such as providing announcements and/or collecting digits. With many types of traditional circuit calls that originate and terminate in the switched network 12, call processing often requires the making of announcements and/or the collecting of digits. To that end, the routing instructions returned by the IN NCP 36 to the circuit switched network 12 will alert the network to invoke the necessary peripheral(s) not shown) to make an announcement and/or collect digits. For IP calls originating in the IP backbone network 14, providing announcements and/or collecting digits heretofore has proven problematic. In accordance with another aspect of the invention, announcements and/or digits collection may occur as follows for an IP-originated call, such as a call launched from the IP telephone set 26, served by the IP PBX 25, to the POTS-type telephone set 21 served by the POTS-type PBX 20. A user at the IP telephone set 26 launches a call by dialing the telephone number 1-732-555-5678 associated with the POTS-type telephone set 21 to initiate a call request. The call request passes into the IP backbone network 14 for receipt at the call agent 40, which in response, queries the IP NCP 36. Upon receipt of the query, the IP NCP 36 executes its service logic.

If an announcement and/or digit collection are needed, the IN NCP 36 sends a request to the call agent 40. The call agent 40 then signals the IP backbone network 12 to establish a bearer path between the caller (telephone set 26) and a Network Interactive Voice Response System (NIVR) 44 so that the NIVR can play an announcement to, and/or collect digits from the IP telephone set 26 served by the IP PBX 25, depending on what action is required in view of the response returned by the IN NCP 36. The NIVR 44 plays the announcement(s) and/or collects digits from the IP telephone set 26 served by the IP PBX 25. The NIVR 44 sends whatever digits it collected to the call agent 40, which in turn, sends the information to the IP NCP 36 for validation. Thereafter, the call agent 40 causes the bearer connection between the IP telephone set 26 served by the IP PBX 25 and the NIVR 44 to be torn down. Following validation, the IP NCP 36 sends the routing number of 732-420-5678 to the call agent 40, and in response, the call agent routes the call to the switched network 12 using ISUP via the gateway 16 and the call is set up.

In the illustrated embodiment of FIG. 1, access to the NIVR 44 occurs only though the IP backbone network 14. The switched network 12 would employ its own NIVR(s). Alternatively, access to the NIVR 44 could occur through gateway 16, thus permitting both the switched network 12 and the IP backbone network to share this resource.

Alternate Routing for a Packet-to-Circuit Call

The call flow discussed earlier for a packet-to-circuit call did not involve any type of alternate routing. In other words, the call flow presumed that the intended recipient (the POTS-type telephone set 21) was "on-hook" and thus free to accept the call. Often, an intended recipient may be off hook and busy with another caller. Traditionally, the call logic that existed in the legacy routing plans for conventional circuit-to-circuit calls permitted alternate routing in the event that the intended recipient was busy. Other types of busy conditions may occur when the trunk(s) between a network switch and a PBX are busy while the call recipient may not be. Heretofore, accomplishing such alternate routing for Packet-to-Circuit calls proved problematic. However, in accordance with the present principles, alternate call routing for a packet-to circuit call may occur as follows.

A user at an IP telephone, say the IP telephone set 26 served by the IP PBX 25, launches a call request by dialing the number 1-732-555-5678 associated with a circuit destination, say the POTS-type telephone set 21 served by the POTS-type PBX 20. The call enters the IP backbone network 14 for receipt by the call agent 40, which, in response, queries the IP NCP 36. Upon receipt of the query, the IP NCP 36 executes its service logic and returns to the call agent 40 the routing number 1-732-420-5678 associated with the POTS-type telephone set 21. In addition to returning the routing number, the IN NCP 36 will also indicate to the call agent 40 the need to be informed if the POTS-type telephone set is busy.

The call agent 40 translates the routing number and, upon determining that the intended destination lays in the switched network 12, the call agent routes the call to the gateway 16. In addition, the call agent 40 also sets a Busy "trigger" based on the information received from the IP NCP 36. The call proceeds into the switched network 12 for termination at the POTS-type telephone set 21. If the POTS-type telephone set 21 is busy, the switched network 12 sends a Release message with cause value=34 to the gateway 16, which, in response, sends a busy indicator to the call agent 40. Note that the cause value=34 is an example of cause values associated with busy conditions and is not the only one. The cause value=34 and its corresponding messages are associated with the ISUP signaling protocol.

The call agent 40 then sends the busy indicator to the IP NCP 36, which, in response, sends an alternate routing number 732-555-5678 for the POTS-type telephone set 21 to the call agent 40. Upon its receipt, the call agent 40 translates the alternate routing number and routes the call to the switched network using ISUP via the gateway 16 and the call is set up through the LEC 23. (Note that the IP NCP 36 may be able to send the call agent 40 multiple routing numbers in the first response. If so, the second query to the IP NCP will not be necessary.)

Alternate call routing could also occur in a similar manner when the network-PBX link is busy as well as when the gateway is busy during an attempt to route a packet to circuit call. In the later case, the call could be routed to an alternate gateway (not shown) or to an alternate destination. Thus, the IN NCP 36 can provide the call agent 40 with instructions for perform alternate routing for a variety of busy conditions.

Although the above examples discuss the routing of SDN calls, the methodology applies equally to special featured calls as well. Upon receipt of a special featured call within either of the switched network 12 or the IP backbone network 14, a query is launched to the IN NCP 36 with the called party number. Using the called party number, the IN NCP can establish the called party's routing plan to return the called party routing number. The call is then routed in accordance with the called party routing number as described previously. Indeed, the above example of routing special featured calls based on the calling party number is applicable to other services such as AT&T's PCP service.

The foregoing describes a technique for handling subscriber calls in accordance with the subscriber's routing plan independent of the architecture of the system.

The above-described embodiments merely illustrate the principles of the invention. Those skilled in the art may make various modifications and changes that will embody the principles of the invention and fall within the spirit and scope thereof.

What is claimed is:

1. A technique for handling subscriber calls in a communications network using a routing plan prescribed by the subscriber independent of the manner in which the calls originate and terminate, comprising the steps of:

receiving in the network a call from a calling party dialed to a called party, launching a query to database containing routing plans to obtain a called party routing number for the called party in accordance with a subscriber routing plan that is independent of call origination and termination;

mapping the called party routing number to a physical port in the network when the called party routing number corresponds to a circuit-switched call destination; or to a IP address when the called party routing number corresponds to a packet-based call destination;

routing the call to the call destination in accordance with the mapping;

determining if the routing the call in accordance with said mapping yields a busy trigger, and if so, then establishing an alternate call routing number destination by querying said database; and mapping the alternate called party routing number to a physical port in the network when the alternate called party routing number corresponds to a circuit-switched call destination; or to an IP address when the called party's routing number corresponds to a packet-based call destination; and routing the call to the call destination in accordance with the mapping.

2. The method according to claim 1 wherein the call is received in the network as a circuit-switched call having a packet-based destination.

3. The method according to claim 1 wherein the call is received in the network as a packet-based call having a circuit-switched destination.

4. The method according to claim 1 wherein the call is received in the network as a packet-based call having a packet based destination.

5. The method according to claim 1 wherein the query includes at least one of the called party number and a number associated with the calling party.

6. The method according to claim 1 wherein query is launched to the database to also determine whether the calling party should receive an announcement, and if so then providing an announcement to the calling party.

7. The method according to claim 1 wherein query is launched to the database to also determine whether digits should be collected from the calling party, and if so then collecting digits from the calling party.

8. The method according to claim 1 wherein query is launched to the database to also determine whether the calling party should receive an announcement and digits should be collected from the calling party, and if so, then
providing an announcement to the calling party; and
collecting digits from the calling party.

9. The method according to claim 1 wherein the routing plans in the database exists to support circuit based destinations and is augmented to handle packet-based destinations.

10. The method according to claim 1 wherein the database and the routing plans contained therein are entirely new.

11. A technique for handling subscriber calls in a communications network using a routing plan prescribed by the subscriber independent of the manner in which the calls originate and terminate, comprising the steps of:

receiving in the network a call from a calling party dialed to a called party, launching a query to database containing routing plans to obtain a called party routing number for the called party in accordance with a subscriber routing plan that is independent of call origination and termination;

mapping the called party routing number to a physical port in the network when the called party routing number corresponds to a circuit-switched call destination; or to a IP address with the called party routing number corresponds to a packet-based call destination;

routing the call to the call destination in accordance with the mapping;

determining if the routing the call in accordance with said mapping yields a busy trigger, and if so, then establishing an alternate call routing number destination by querying said database; and mapping the alternate called party routing number to a physical port in the network when the alternate called party routing number corresponds to a circuit-switched call destination; or to a IP address when the called party's routing number corresponds to a packet-based call destination; and routing the call to the call destination in accordance with the mapping of the alternate called party number.

12. The method according to claim 11 wherein the call is received in the network as a circuit-switched call having a packet-based destination.

13. The method according to claim 11 wherein the call is received in the network as an packet-based call having a circuit-switched destination.

14. The method according to claim 11 wherein the call is received in the network as an packet-based call having a packet based destination.

15. The method according to claim 11 wherein the query includes at least one of the called party number and a number associated with the calling party.

16. The method according to claim 11 wherein query is launched to the database to also determine whether the calling party should receive an announcement, and if so then providing an announcement to the calling party.

17. The method according to claim 11 wherein query is launched to the database to also determine whether digits should be collected from the calling party, and if so then collecting digits from the calling party.

18. The method according to claim 11 wherein query is launched to the database to also determine whether the calling party should receive an announcement and digits should be collected from the calling party, and if so, then
providing an announcement to the calling party; and
collecting digits from the calling party.

* * * * *

UNITED STATES PATENT AND TRADEMARK OFFICE
CERTIFICATE OF CORRECTION

PATENT NO. : 6,954,455 B1
APPLICATION NO. : 09/824378
DATED : October 11, 2005
INVENTOR(S) : Al Hakim et al.

It is certified that error appears in the above-identified patent and that said Letters Patent is hereby corrected as shown below:

Column 1,
Line 10, delete "one of a packet-based or circuit based" and insert -- one of packet-based or circuit-based --.
Line 24, delete "an" and insert -- a --.
Line 28, delete "Network" and insert -- network --.
Line 52, after "carrier" insert -- to --.

Column 2,
Line 6, delete "terminate at a packet-based PBX" and insert -- terminate in a packet-based network --.
Line 23, delete "called party".
Line 28, delete "mapped a to physical port" and insert -- mapped to a physical port --.
Line 33, delete "include" and insert -- be implemented on --.
Line 51, after "plan" insert -- , --.

Column 3,
Line 12, after "sets 21" insert -- , --.
Line 22, after "from" insert -- , --.
Line 25, delete "extensions" and insert -- extension --.
Line 38, after "at" insert -- , --.
Lines 45, 59 and 66, delete "NCP36" and insert -- NCP 36 --.
Line 54, delete "packet and circuit-switched networks" and insert -- packet or circuit-switched network --.

Column 4,
Lines 1, 7, 26, 53, 54, 58, 60, 65 and 66, delete "NCP36" and insert -- NCP 36 --.
Line 12, delete "(NCP)" and insert -- NCP --.
Line 18, delete "intelligent Service control point" and insert -- Intelligent Service Control Point --.
Line 40, after "network 12" insert -- , --.
Line 47, after "subscriber" insert -- , --.
Line 50, delete "processor of" and insert -- processor or --.
Line 66, after "calling party number" insert -- , --.

Column 5,
Lines 1 and 2, delete "NCP36" and insert -- NCP 36 --.
Line 8, after "pays" insert -- , --.
Line 18, delete "and by" and insert -- or --.
Line 48, delete "part" and insert -- Part --.
Line 56, delete "extensions" and insert -- extension --.

UNITED STATES PATENT AND TRADEMARK OFFICE
CERTIFICATE OF CORRECTION

| | |
|---|---|
| PATENT NO. | : 6,954,455 B1 |
| APPLICATION NO. | : 09/824378 |
| DATED | : October 11, 2005 |
| INVENTOR(S) | : Al Hakim et al. |

It is certified that error appears in the above-identified patent and that said Letters Patent is hereby corrected as shown below:

Column 6,
Line 6, after "associated" insert -- with --.
Line 8, delete "number, i.e., the telephone number" and insert -- number (i.e., the telephone number --.
Line 9, delete "telephone, (i.e., the".
Line 52, before "not shown)" insert -- ( --.

Column 7,
Line 7, after "collect digits from" insert -- , --.

Column 8,
Line 16, delete "later" and insert -- latter --.
Line 19, delete "perform" and insert -- performing --.
Line 49, before "database" insert -- a --.

Column 9,
Lines 18, 22 and 26, before "query" insert -- the --.
Line 33, delete "exists" and insert -- exist -- and delete "circuit based" and insert -- circuit-based --.
Line 34, delete "is" and insert -- are --.
Line 44, before "database" insert -- a --.

Column 10,
Line 4, delete "with" and insert -- when --.
Line 7, after "mapping" insert -- of the called party routing number --.
Lines 24 and 27, delete "an packet-based call" and insert -- a packet-based call --.
Line 28, delete "packet based" and insert -- packet-based --.

UNITED STATES PATENT AND TRADEMARK OFFICE
CERTIFICATE OF CORRECTION

PATENT NO.       : 6,954,455 B1
APPLICATION NO.  : 09/824378
DATED            : October 11, 2005
INVENTOR(S)      : Al Hakim et al.

It is certified that error appears in the above-identified patent and that said Letters Patent is hereby corrected as shown below:

<u>Column 10 (cont'd),</u>
Lines 32, 36 and 40, before "query" insert -- the --.

Signed and Sealed this

Twenty-seventh Day of June, 2006

JON W. DUDAS
*Director of the United States Patent and Trademark Office*